US012613617B2

(12) United States Patent
Tappan et al.

(10) Patent No.: US 12,613,617 B2
(45) Date of Patent: Apr. 28, 2026

(54) HUMAN MACHINE INTERFACE GENERATION FOR INDUSTRIAL MONITORING

(71) Applicant: Baker Hughes Oilfield Operations LLC, Houston, TX (US)

(72) Inventors: Jackie Tappan, Houston, TX (US); Scott Williams, Rutland, MA (US); Eric Gilchrist, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 854 days.

(21) Appl. No.: 17/086,997

(22) Filed: Nov. 2, 2020

(65) Prior Publication Data

US 2021/0141503 A1     May 13, 2021

Related U.S. Application Data

(60) Provisional application No. 62/932,437, filed on Nov. 7, 2019.

(51) Int. Cl.
*G06F 3/0482* (2013.01)
*G06F 3/0484* (2022.01)

(52) U.S. Cl.
CPC .......... *G06F 3/0484* (2013.01); *G06F 3/0482* (2013.01)

(58) Field of Classification Search
CPC ... G06F 3/0484; G06F 3/0482; G05B 19/042; G05B 23/0216
See application file for complete search history.

(56) References Cited

U.S. PATENT DOCUMENTS

| 7,152,116 B1 * | 12/2006 | Austin | H04L 61/30 |
| | | | 709/245 |
| 9,449,130 B1 * | 9/2016 | Kukal | G06F 30/327 |
| 9,760,100 B2 * | 9/2017 | Garr | G05B 15/02 |
| 9,811,233 B2 * | 11/2017 | Abaya | G06F 9/451 |
| 10,213,861 B2 * | 2/2019 | Stoner | B23K 9/09 |

(Continued)

FOREIGN PATENT DOCUMENTS

WO     WO-2015099895 A1 *  7/2015   ......... G05B 19/4063

*Primary Examiner* — Scott T Baderman
*Assistant Examiner* — Mario M Velez-Lopez
(74) *Attorney, Agent, or Firm* — Mintz, Levin, Cohn, Ferris, Glovsky and Popeo, P.C.

(57) ABSTRACT

A method for generating GUIs for condition monitoring is provided and includes maintaining a machine model configuration associating measurement points of a first machine component with first data sources. A generated GUI includes a first portion displaying a list of machines including the first machine and a second machine, and a second portion including visualization of first machine components, including outputs of the first data sources. In response to user selection, the first component visualization is copied from the second GUI portion. The first GUI portion is updated to add the first component as a second component of the second machine. The copied visualization is pasted within the second GUI portion corresponding to the second component. Respective second data sources of the second component measurement points are identified, and the second GUI portion corresponding to the second component can be updated to display the output of the second data sources.

10 Claims, 16 Drawing Sheets

(56) References Cited

U.S. PATENT DOCUMENTS

| | | | | |
|---|---|---|---|---|
| 10,956,014 B2* | 3/2021 | Tappan | G06F 3/0482 | |
| 11,604,447 B2* | 3/2023 | Hiruta | G05B 19/0428 | |
| 11,663,442 B2* | 5/2023 | Cella | H04W 4/80 | |
| | | | | 702/188 |
| 11,665,223 B1* | 5/2023 | Duffield | H04L 41/0806 | |
| | | | | 709/219 |
| 2003/0035005 A1* | 2/2003 | Kodosky | H04L 67/75 | |
| | | | | 715/763 |
| 2003/0037322 A1* | 2/2003 | Kodosky | G06F 3/0486 | |
| | | | | 717/162 |
| 2005/0172261 A1* | 8/2005 | Yuknewicz | G06F 8/38 | |
| | | | | 717/136 |
| 2007/0035398 A1* | 2/2007 | Vesel | G05B 23/0267 | |
| | | | | 340/572.1 |
| 2008/0052367 A1* | 2/2008 | Liu | H04L 67/34 | |
| | | | | 709/208 |
| 2008/0077268 A1* | 3/2008 | Retlich | G06Q 30/0633 | |
| | | | | 700/117 |
| 2009/0076779 A1* | 3/2009 | Simmons | F24F 11/62 | |
| | | | | 703/1 |
| 2009/0307255 A1* | 12/2009 | Park | G06F 16/25 | |
| | | | | 707/999.102 |
| 2011/0047516 A1* | 2/2011 | Pavan | G06Q 10/06 | |
| | | | | 715/853 |
| 2014/0100824 A1* | 4/2014 | Bess | G06F 30/15 | |
| | | | | 703/1 |
| 2015/0022516 A1* | 1/2015 | Jutan | G06T 13/40 | |
| | | | | 345/419 |
| 2015/0186483 A1* | 7/2015 | Tappan | G05B 19/4063 | |
| | | | | 707/737 |
| 2016/0050128 A1* | 2/2016 | Schaible | H04L 67/565 | |
| | | | | 709/218 |
| 2016/0095189 A1* | 3/2016 | Vangeel | F24F 11/63 | |
| | | | | 315/152 |
| 2016/0146867 A1* | 5/2016 | Schuh | G01R 21/133 | |
| | | | | 702/182 |
| 2016/0167311 A1* | 6/2016 | Schmidt | B33Y 50/00 | |
| | | | | 700/98 |
| 2016/0274553 A1* | 9/2016 | Strohmenger | G05B 17/02 | |
| 2016/0320958 A1* | 11/2016 | Roaldson | G05B 23/0267 | |
| 2020/0167059 A1* | 5/2020 | Luckey | G06F 3/0482 | |
| 2021/0096542 A1* | 4/2021 | Stump | G05B 19/4184 | |
| 2021/0097149 A1* | 4/2021 | Stump | G06N 5/045 | |
| 2021/0157312 A1* | 5/2021 | Cella | H04L 1/0041 | |
| 2022/0108262 A1* | 4/2022 | Cella | G05B 17/02 | |
| 2022/0236965 A1* | 7/2022 | Rahill-Marier | G06F 8/38 | |
| 2023/0098602 A1* | 3/2023 | Cella | B25J 9/1674 | |
| | | | | 700/248 |
| 2023/0403968 A1* | 12/2023 | Leininger | A01B 79/02 | |

* cited by examiner

1350

Replace Point     [?] [X]

> ⊞ FPSO Fleet  >  ⊞ Orr  >  🗏 Compressor A-3 (Gathering)

Hierarchy Selection

▾ 🗏 Compressor A-3 (Gathering)
  ▸ 🗏 Motor
  ▸ 🗏 Gearbox
  ▸ 🗏 Compressor
  ▾ 🗏 Lube Oil System
      ● Lube Oil Header Pressure
    🗏 Seal Gas System
    🗏 Surge Control
    🗏 First Out
    🗏 Permissives

[ Save ]     [ Cancel ]

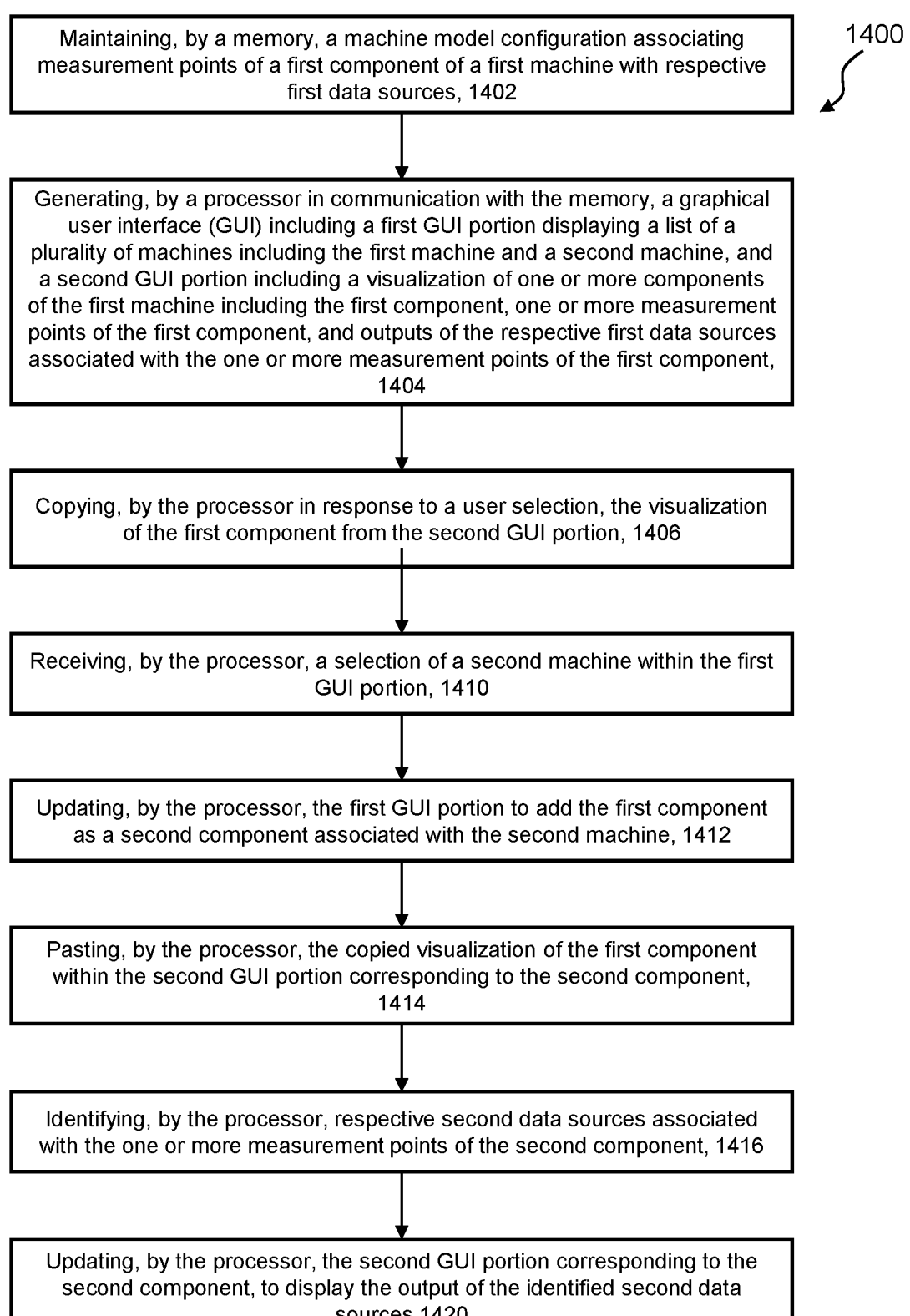

1400

Maintaining, by a memory, a machine model configuration associating measurement points of a first component of a first machine with respective first data sources, 1402

Generating, by a processor in communication with the memory, a graphical user interface (GUI) including a first GUI portion displaying a list of a plurality of machines including the first machine and a second machine, and a second GUI portion including a visualization of one or more components of the first machine including the first component, one or more measurement points of the first component, and outputs of the respective first data sources associated with the one or more measurement points of the first component, 1404

Copying, by the processor in response to a user selection, the visualization of the first component from the second GUI portion, 1406

Receiving, by the processor, a selection of a second machine within the first GUI portion, 1410

Updating, by the processor, the first GUI portion to add the first component as a second component associated with the second machine, 1412

Pasting, by the processor, the copied visualization of the first component within the second GUI portion corresponding to the second component, 1414

Identifying, by the processor, respective second data sources associated with the one or more measurement points of the second component, 1416

Updating, by the processor, the second GUI portion corresponding to the second component, to display the output of the identified second data sources 1420

FIG. 14

HUMAN MACHINE INTERFACE GENERATION FOR INDUSTRIAL MONITORING

CROSS-REFERENCE TO RELATED APPLICATIONS

This application claims the benefit of U.S. Provisional Patent Application No. 62/932,437, filed on Nov. 7, 2019, and entitled "Human Machine Interface Generation for Industrial Monitoring," the entirety of which is incorporated by reference.

BACKGROUND

Many process-intensive industries, such as hydrocarbon refining and power generation, can rely heavily upon operation of machinery, and in some instances, continuous operation of machinery. In these environments, failure of one or more machines can incur significant costs due to repair expenses as well as loss of production and potential injury to workers. Given these risks, it can be common to monitor certain operating parameters of one or more machine components. Measurements of the operating parameters can provide an indication of the mechanical condition of a machine component, allowing preventative maintenance (e.g., repair, replacement, etc.) to be performed on the machine component prior to failure. This condition monitoring can provide one or more long term benefits, such as lower production costs, reduced equipment down time, improved reliability, and enhanced safety.

SUMMARY

Condition monitoring systems can be configured to provide a variety of tools to facilitate identification and diagnosis of machine faults. Tools can include setting and display of current status according to analysis of measured parameters, summaries of events (e.g., warnings alarms, etc.), plots of current measurements/analyses, historical measurements/analyses, and comparisons thereof, amongst other. These tools can be accessed via a graphical user interface (GUI) of a human machine interface (HMI), allowing for selection and display. As an example, a GUI can include views of machines at different levels (e.g., site level, process system level, individual machines, etc.) Measurement points associated with respective machines can also be displayed.

However, build out of GUI views for each site, unit, machine, and sub-system of an industrial operation can be costly, both in terms of time and expense. This high cost to develop and maintain HMIs can be a deterrent for deployment.

Accordingly, systems and methods are provided for improved creation of graphical user interfaces (GUIs). All configuration information for a machine displayed in existing GUI, including measurement points, can be copied to a new GUI and associated with a different portion of the industrial environment. As an example, configuration information for a first compressor associated with a first parent machine can be copied to provide a new GUI representing a second compressor associated with a second parent machine. With this capability, generic GUI can be generated for common industries and units. This capability greatly increases the efficiency and consistency of GUI creation and encourages the use of GUIs for diagnosing machine health.

In an embodiment, a method for generating graphical user interfaces for condition monitoring is provided. The method can include maintaining, by a memory, a machine model configuration associating measurement points of a first component of a first machine with respective first data sources. The method can also include generating, by a processor in communication with the memory, a graphical user interface (GUI) including a first GUI portion displaying a list of a plurality of machines including the first machine and a second GUI portion including a visualization of one or more components of the first machine including the first component, one or more measurement points of the first component, and outputs of the respective first data sources associated with the one or more measurement points of the first component. The method can additionally include copying, by the processor in response to a user selection, the visualization of the first component from the second GUI portion. The method can further include receiving, by the processor, a selection of a second machine within the first GUI portion. The method can also include updating, by the processor, the first GUI portion to add the first component as a second component associated with the second machine. The method can additionally include pasting, by the processor, the copied visualization of the first component within the second GUI portion corresponding to the second component. The method can further include identifying, by the processor, respective second data sources associated with the one or more measurement points of the second component. The method can additionally include updating, by the processor, the second GUI portion corresponding to the second component, to display the output of the identified second data sources.

In an embodiment, the machine model configuration can include associations of second data sources with respective ones of the measurement points of the second component.

In an embodiment, identifying the respective second data sources can include receiving, by the processor, the second data sources associated with respective ones of the measurement points of the second component from the machine configuration model.

In an embodiment, identifying the respective second data sources can include receiving, by the processor, the second data sources associated with respective ones of the measurement points of the second component from user input.

In an embodiment, the method can also include updating, by the processor, the second GUI portion corresponding to the second component to display a placeholder in lieu of the output of a second data source associated with at least one of the measurement points of the second component.

In an embodiment, the method can also include, by the processor, updating the second GUI portion corresponding to the second component to display a list of second data sources in response to selection of the placeholder of a measurement data point, and receiving a user selection of a second data source from the list of second data sources.

In an embodiment, the method can also include generating, by the processor within the first GUI portion, a hierarchical view. The hierarchical view can include a site level including one or more sites, a process system level including a plurality of process systems of a site selected from the site level, and a machine level including the plurality of machines of a process system selected from the process system level.

In an embodiment, a system for generating graphical user interfaces for condition monitoring is provided. The system can include a memory maintaining a machine model configuration associating measurement points of a first component of a first machine with respective first data sources. The system can also include a processor in communication with the memory. The processor can be configured to generate a graphical user interface (GUI) including a first GUI portion and a second GUI portion. The first GUI portion can display a list of a plurality of machines including the first machine and a second machine. The second GUI portion can include a visualization of one or more components of the first machine including the first component, one or more measurement points of the first component, and outputs of the respective first data sources associated with the one or more measurement points of the first component. The processor can also be configured to copy, in response to a user selection, the visualization of the first component from the second GUI portion. The processor can be further configured to receive a selection of a second machine within the first GUI portion. The processor can be additionally configured to update the first GUI portion to add the first component as a second component associated with the second machine. The processor can also be configured to paste the copied visualization of the first component within the second GUI portion corresponding to the second component. The processor can be configured to additionally identify respective second data sources associated with the one or more measurement points of the second component. The processor can be further configured to update the second GUI portion corresponding to the second component to display the output of the identified second data sources.

In an embodiment, the machine model configuration can also include associations of second data sources with respective ones of the measurement points of the second component.

In an embodiment, the processor can also be configured to identify the respective second data sources by receiving the second data sources associated with respective ones of the measurement points of the second component from the machine configuration model.

In an embodiment, the processor can also be configured to identify the respective second data sources by receiving the second data sources associated with respective ones of the measurement points of the second component from user input.

In an embodiment, the processor can also be configured to update the second GUI portion corresponding to the second component to display a placeholder in lieu of the output of a second data source associated with at least one of the measurement points of the second component.

In an embodiment, the processor can also be configured to update the second GUI portion corresponding to the second component to display a list of second data sources in response to selection of the placeholder of a measurement data point, and to receive a user selection of a second data source from the list of second data sources.

In an embodiment, the processor can also be configured to generate, within the first GUI portion, a hierarchical view. The hierarchical view can include a site level including one or more sites, a process system level including a plurality of process systems of a site selected from the site level, and a machine level including the plurality of machines of a process system selected from the process system level.

DESCRIPTION OF DRAWINGS

These and other features will be more readily understood from the following detailed description taken in conjunction with the accompanying drawings, in which:

FIG. 14 is a flow diagram including one exemplary embodiment of a method for generating a GUI for condition monitoring.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial machinery can be monitored by monitoring systems to ensure operation within acceptable tolerances. In general, machine monitoring can include measuring operating parameters of one or more of the machine components by sensors, determining whether the machine components are operating properly from the operating parameter measurements, and issuing warnings if a machine component is determined to be operating improperly. These warnings can allow corrective action to be taken in advance of machine failure, providing benefits such as lower production costs, reduced equipment down time, improved reliability, and/or improved safety.

Graphical user interfaces (GUIs) can be employed to present visualizations that represent the machines being monitored within a condition monitoring system. In addition to the visualizations, the condition monitoring system may present the data received by the sensors associated with the monitored machines via the GUI. As an example, machine component views are navigated from a first level (e.g., process system) to a second level (e.g., a machine of the process system), to a third level (e.g., a portion of the machine or a supporting sub-system, such as lube oil), and so on. Data views can be accessible from respective machine component views. However, it can be time consuming to build out GUI views for each site, unit, machine, and sub-system within a facility. Accordingly, systems and methods are provided for improved creation of graphical user interfaces (GUIs). All configuration information for a machine displayed in existing GUI, including measurement points, can be copied to a new GUI and associated with a different portion of the industrial environment. As an example, configuration information for a first compressor associated with a first parent machine can be copied to provide a new GUI representing a second compressor associated with a second parent machine. With this capability, generic GUI can be generated for common industries and units. This capability greatly increases the efficiency and consistency of GUI creation and encourages the use of GUIs for diagnosing machine health.

Embodiments of systems and corresponding methods for monitoring industrial machines are discussed herein. However, embodiments of the disclosure can be employed for monitoring other machines without limit.

Figure 1:
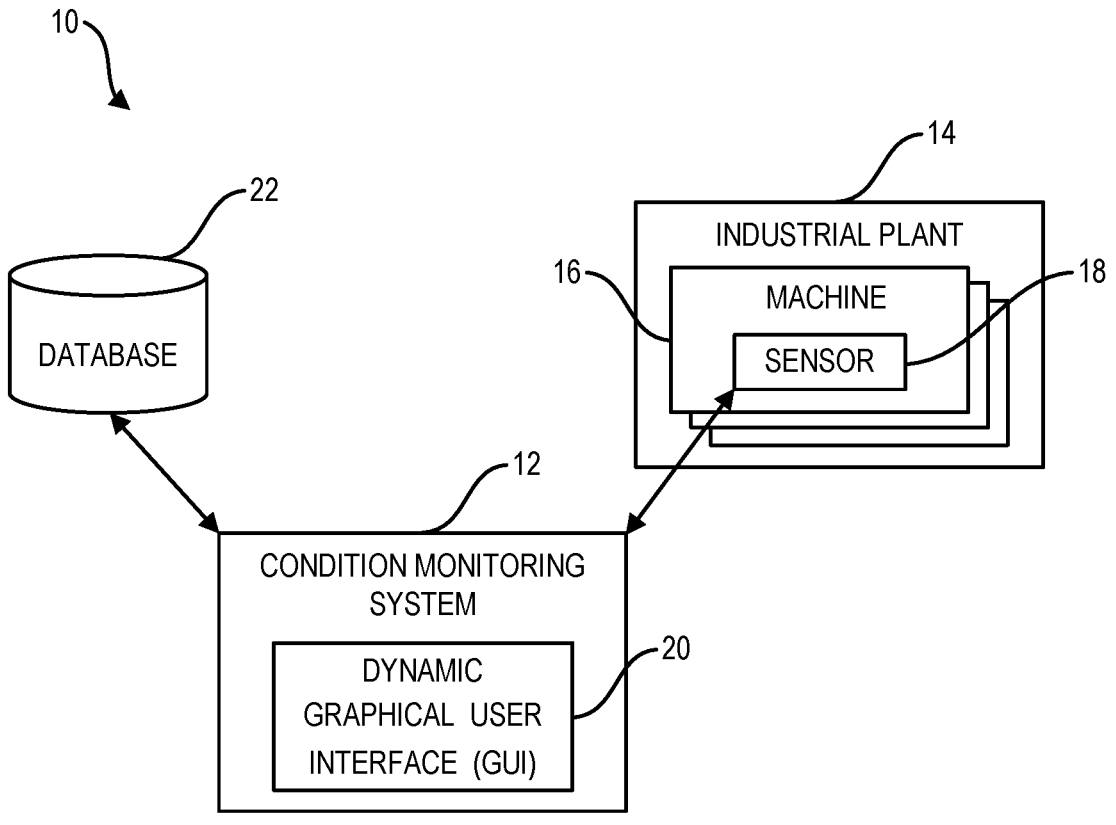
FIG. 1 is a block diagram illustrating one exemplary embodiment of an industrial monitoring system including a condition monitoring system configured to monitor one or more machine components of an industrial plant.

FIG. 1 is a block diagram illustrating one exemplary embodiment of an industrial monitoring system 10 in which various types of machines used for industrial processes can be monitored. The industrial monitoring system 10 can include a condition monitoring system 12, an industrial plant 14, and a database 22. The industrial plant 14 can include any type of industrial environment where different components or machines may be used to complete one or more industrial processes. As such, the industrial plant 14 may correspond to an oil refinery, a manufacturing facility, a turbomachine system, a power generation system, a gasification system, a chemical production system, a gas turbine system, a stream turbine system, a combined cycle system, a power plant, or the like.

The components in the industrial plant 14 can include one or more machines 16 or machine components. Examples of the one or more machines 16 can include motors, gas turbines, heat exchangers, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, and the like.

One or more of the sensors 18 can be associated with each machine 16. The sensors 18 can be any sensor configured to acquire information with respect to the operation of the respective machine 16. Examples of the sensors 18 can include temperature sensors, current sensors, voltage sensors, pressure sensors, displacement sensors, velocity sensors, acceleration sensors, flow sensors, clearance sensors, flame sensors, gas composition sensors, vibration sensors, and the like. Measurements acquired by the sensors 18 may be received by a memory 28 of the condition monitoring system 12, a processor 26 of the condition monitoring system 12 and combinations thereof via a direct link (i.e., hardwired), a network link, or a portable memory device (e.g., Universal Serial Bus memory drive).

Figure 2:
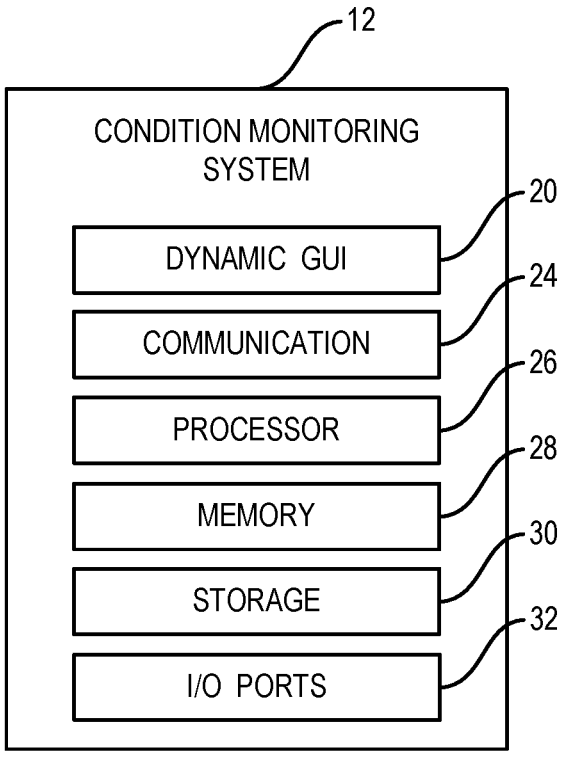
FIG. 2 is a block diagram illustrating one exemplary embodiment of the condition monitoring system of FIG. 1.

As shown in FIG. 2, the condition monitoring system 12 can include components configured to display data, process data, and analyze data. As shown, the condition monitoring system 12 includes a communication component 24, a processor 26, a memory 28, a data storage 30, input/output (I/O) ports 32, and the like. The communication component 24 can be a wireless or wired communication component that facilitates communication between the condition monitoring system 12, the machines 16, the sensors 18, the database 22, other control or monitoring systems, and the like. The processor 26 can be any type of computer processor or microprocessor capable of executing computer-executable code. The memory 28 and the data storage 30 can be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, analyze data and dynamically link analyzed data with visualizations displayed and selected via the GUI 20. The non-transitory computer-readable media merely indicates that the media is tangible and not a signal.

The processor 26 can be configured to generate graphical user interface (GUI) 20 configured for display upon a display device. The GUI 20 can include visualizations that represent the machines 16 and the sensors 18 being monitored by the condition monitoring system 12. As such, users of the condition monitoring system 12 may monitor the health or status of machines 16 in the industrial plant 14 via the GUI 20. The condition monitoring system 12 can be used to measure one or more process systems including multiple machines 18 (e.g., steam turbine systems, hydraulic turbine systems, wind turbine systems, reactors, gasifiers, gas treatment systems, industrial automation systems, or other suitable process systems).

The GUI 20 can enable the user to perform various types of data processing or analysis using tools provided by the condition monitoring system 12 or by separate data processing or analysis products. As an example, a user can generate a graph plotting a statistical trend of data acquired by a particular sensor 18 over time. In one embodiment, after the statistical trend graph has been generated, the user may dynamically control the data being analyzed by the tool by selecting a different sensor 18 visualization displayed in the GUI 20.

In addition to current data acquired by the sensors 18, the condition monitoring system 12 can receive other data from the database 22. In one aspect, the condition monitoring system 12 can receive historical data related to the data acquired by the sensors 18. In another aspect, the condition monitoring system can receive calculated data associated with a machine 16 or sensor 18, results from previous data processing or analysis functions performed on data associated with a machine 16 or sensor 18, or other contextual data related to the industrial plant 14. For example, the database 22 may include data related to the historical operating conditions (e.g., when operating at full capacity) of the industrial plant 14 such as a plant historian or the like.

Figure 3:
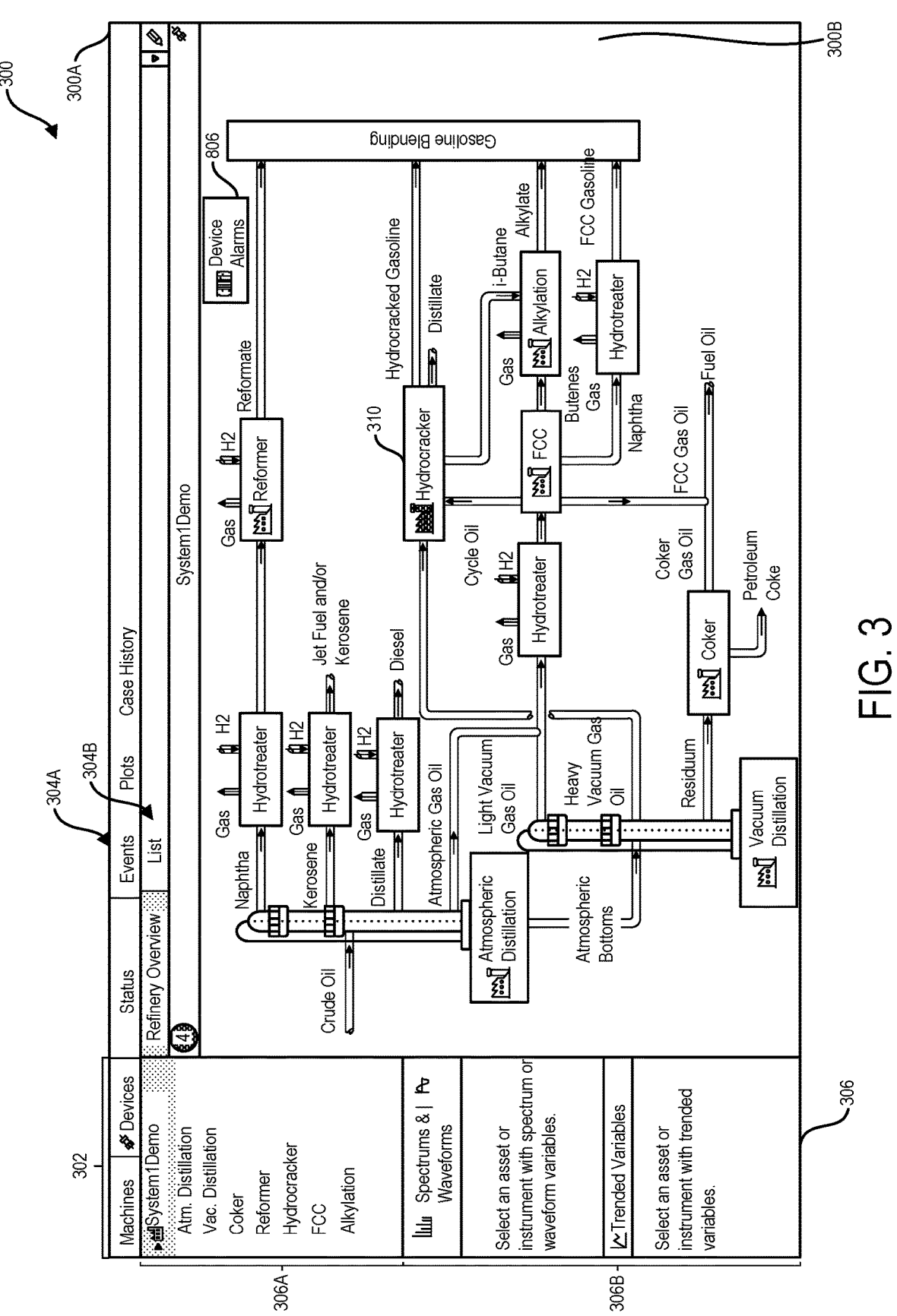
FIG. 3 is a diagram illustrating one exemplary embodiment of a graphical user interface (GUI) generated by the condition monitoring system of FIG. 2 displaying a visualization of components of the industrial plant at a first hierarchical level.

FIG. 3 is a block diagram illustrating one exemplary embodiment of the GUI 20 in the form of GUI 300. The GUI 300 includes a first portion 300A and a second portion 300B. As discussed in detail below, the first GUI portion 300A includes user selectable options, while the second GUI portion 300B is updated to display visualizations of the machines 18 corresponding to options selected within the first GUI portion 300A.

As shown, the first GUI portion 300A includes component options 302, a primary display options 304A, a secondary display options 304B, and a plurality of view spaces 306 having content that dynamically changes in response to selections from the component options 302. As shown, the component options 302 can include machines and condition monitoring devices (e.g., physical monitors).

The primary display options 304A can include status, events, plots, and case history associated with machine or device selected from the component options 302. Status can include a condition of the selected component option based upon one or more measurements acquired by the sensors 18 (e.g., Satisfactory, Unsatisfactory, Warning, Alarm, etc.) Events can be alarm or system logs that alert the user to potential component health issues (e.g., a measured parameter or exceeding a threshold value). Plots can include any graphical representation of measured data. The case history can include plots of historical data and historical reports.

The secondary display options 304B can include sub-types of displays views based upon the selected component option 302 and primary display option 304A. Examples of display sub-types can include a type of defined charting view (e.g. vibration, surge curve) and/or a type of display (e.g., list, bar graph, etc.)

The dynamic view spaces 306 can include a first dynamic view space (e.g., hierarchical view space 306A) and a second dynamic view space (e.g., measurement view space 306B). When a machine or device is selected in the component options 302, the hierarchical view space 306A can be updated to display monitored machine components or devices in a hierarchical view. As an example, machine components can be displayed in a hierarchy including a first level (e.g., a site level), a second level (e.g., a process system level), and a third level (e.g., a machine level). Devices can be displayed with a first level (e.g., a monitoring device), a second level (e.g., a measurement channel), and the like. Greater or fewer hierarchical levels can be employed for the machines and devices without limit.

The measurement view space 306B can display types of operating parameters derived from measurements acquired from sensors 18 (e.g., acceleration, temperature, speed, displacement, gap distance, etc.) Under circumstances where operating parameters are displayed in a data visualization within the second GUI portion 300B (e.g., a plot), the displayed operating parameter can be selected from the measurement view space 306B.

The GUI 300 of FIG. 3 illustrates a visualization displayed in the second GUI portion 300B corresponding to selection of a machine from the component options 302, a view selected from the primary display options 304A, and a view list selected from the secondary display options 304B. The hierarchical view space 306A displays the machine components at a first component level (e.g., a site level in the context of a refinery). As shown, this site-level visualization includes a plurality of process systems 310 (e.g., atmospheric distillation, vacuum distillation, coker, reformer, hydrocracker, fluid catalytic cracking (FCC), and alkylation). Connections between respective process systems 310 (e.g., fluid pathways) are also illustrated.

Figure 4:
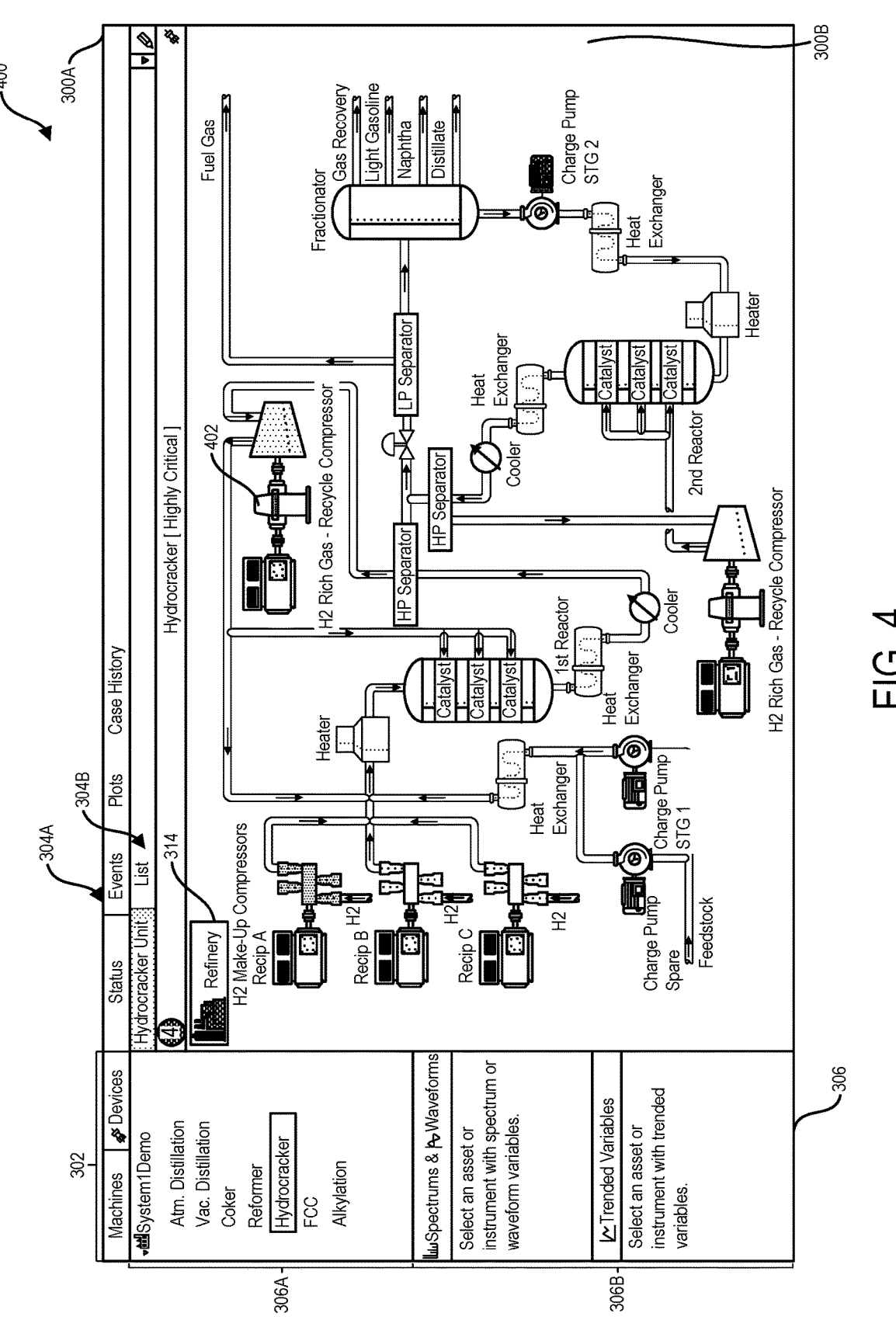
FIG. 4 is a diagram illustrating one exemplary embodiment of a GUI generated by the condition monitoring system of FIG. 2 displaying a visualization of components of the industrial plant at a second hierarchical level.

FIG. 4 illustrates the GUI 20 in the form of GUI 400 that includes a visualization displayed in the second GUI portion 300B corresponding to selection of a process system (e.g., a hydrocracker process system) from the plurality of process systems 310 displayed in the GUI of FIG. 3. As shown, this visualization includes a plurality of machines 402 associated with the hydrocracker process system 310 (e.g., make up compressors, recycle compressors, charge pumps, etc.)

Figure 5:
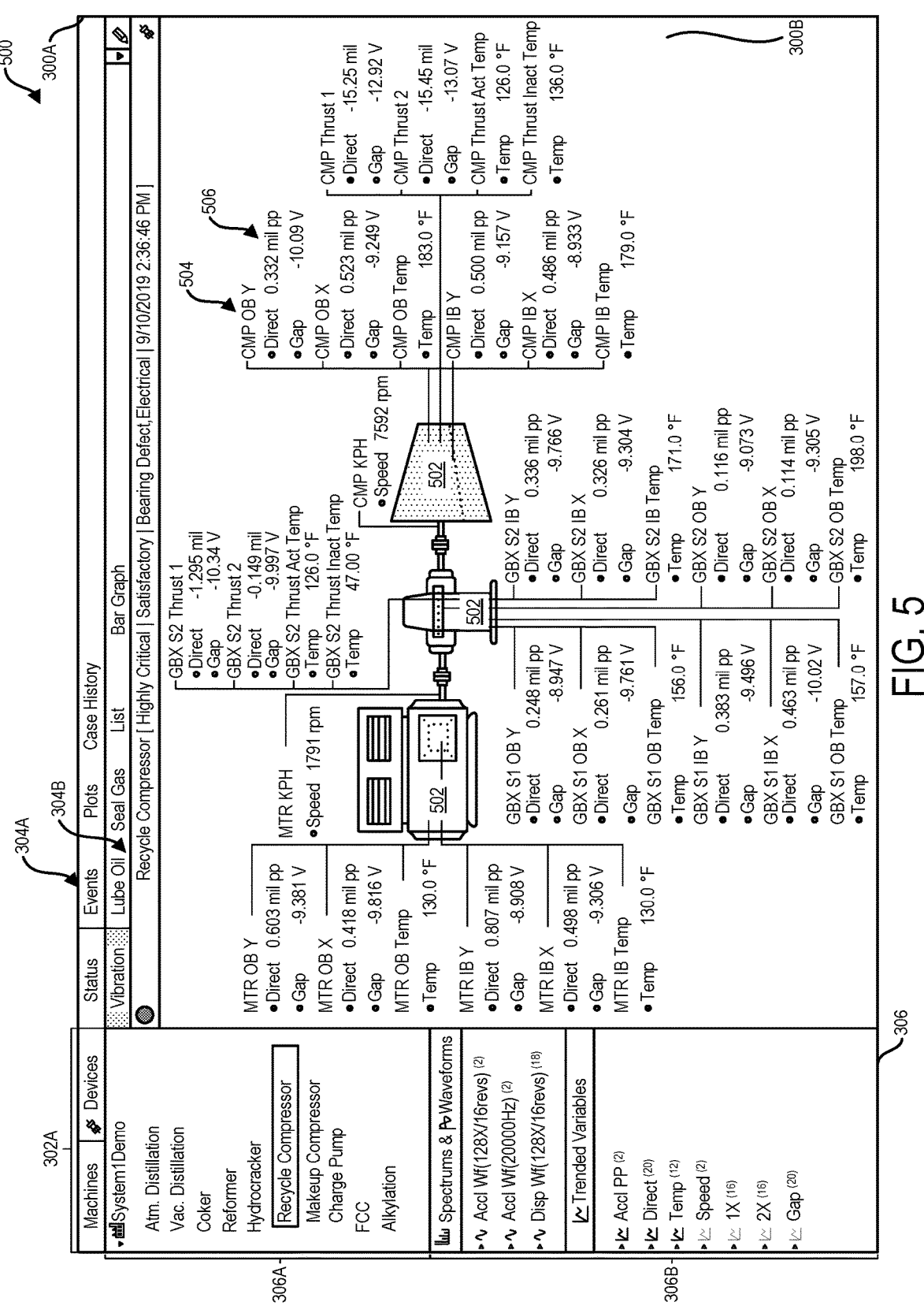
FIG. 5 is a diagram illustrating one exemplary embodiment of a GUI generated by the condition monitoring system of FIG. 2 displaying a visualization of components of the industrial plant at a third hierarchical level.

FIG. 5 illustrates the GUI 20 in the form of GUI 500 including a visualization displayed in the second GUI portion 300B corresponding to selection of a machine (e.g., a recycle compressors) from the plurality of machines 402 displayed in the GUI of FIG. 4. This visualization includes a plurality of machine components 502. Also shown are data fields 504 that display data entries 506 associated with a respective machine component 502. The data entries 506 can include operational parameters such as real-time measurement data received from various sensors 18 disposed on a respective machine component 502, outputs of analyses performed by the processor 26 based upon measurement data received from various sensors 18 disposed on a respective machine component 502, or the like. GUI 500 further updates the measurement view space 306B to display operational parameters (e.g., acceleration, temperature, speed, displacement, gap distance, etc.) associated with a selected machine component 502.

Figure 6:
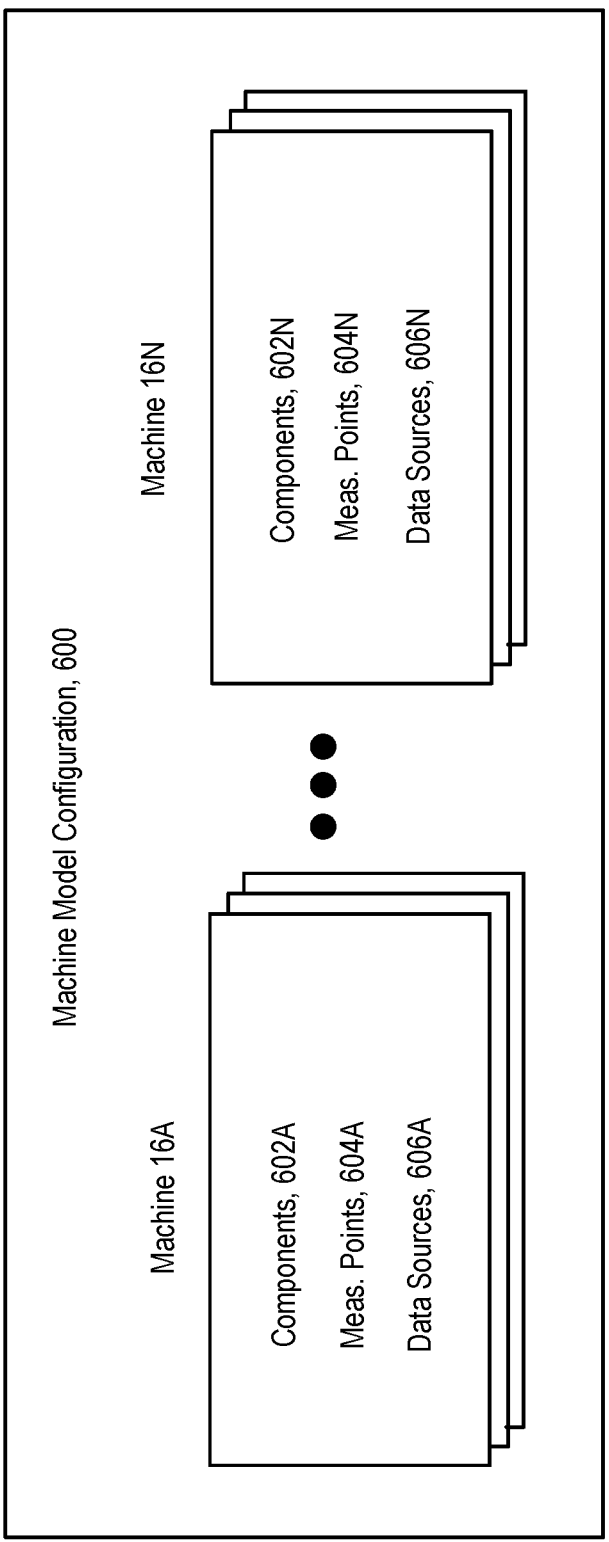
FIG. 6 is a diagram illustrating one exemplary embodiment of a machine model configuration implemented by the condition monitoring system of FIG. 2.

Embodiments of the condition monitoring system 12 can be further configured to facilitate generation of views within GUI 20. As shown in FIG. 6, the condition monitoring system 12 can maintain a machine model configuration 600 for one or more of the machines 16. The machine model configuration 600 identifies components 602 associated with the machine 16, measurement points associated with the components 602, and data sources associated with the measurement points 606. As an example, the machine model configuration 600 for machine 16A includes associations with components 602A, measurement points 604A, and data sources 606A. The machine model configuration 600 for machine 16N includes associations with components 602N, measurement points 604N, and data sources 606N.

As discussed in greater detail below, a visualization of a machine including measurement points displayed in a first GUI view associated with a first machine. The measurement points can display outputs from corresponding data sources according to the machine model configuration 600 of the first machine. The visualization of the components of the first machine in the first GUI view can be copied to a second GUI view associated with a second machine. In one aspect, the measurement points displayed in the second GUI view can be automatically matched with corresponding data sources according to the machine model configuration 600 of the second machine. In another aspect, the measurement points displayed in the second GUI view can be manually matched with corresponding data sources. In either case, the second GUI view can display measurement points reflecting outputs from the second data sources.

With the machine model configuration 600, generic GUIs can be generated for common industries and units. For example, in the context of a refinery, an overall view, and sub-views for each unit (e.g., cokers, hydrocrackers), vibration views for each machine (e.g., recycle compressor, make-up compressor), and its sub-systems (e.g., lube oil system, seal gas system). These GUI views can be leveraged to quickly create a full suite of HMI depictions within a customer enterprise.

Figure 7:
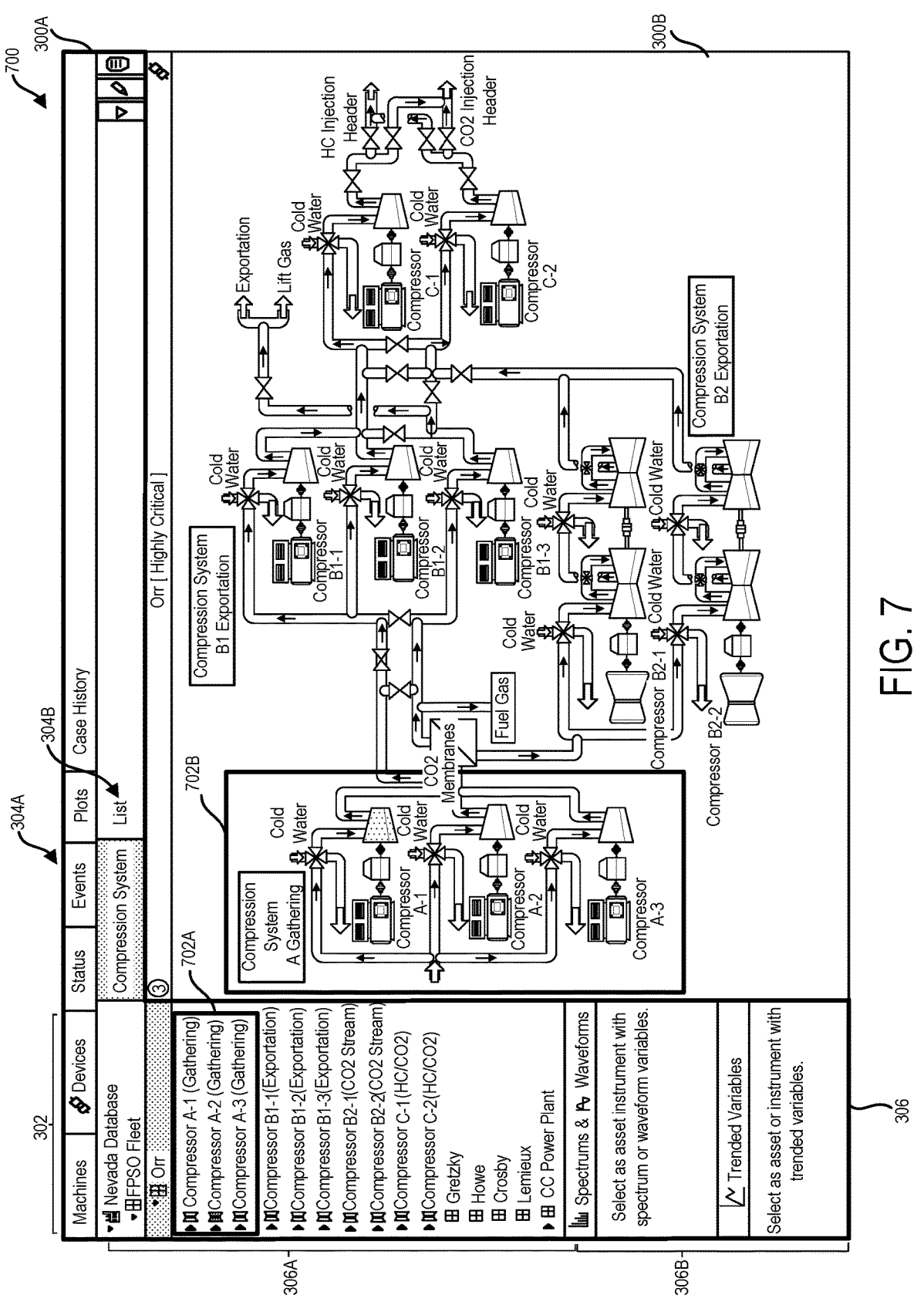
FIG. 7 is a diagram illustrating one exemplary embodiment of a GUI generated by the condition monitoring system of FIG. 2 displaying a visualization of an industrial site (e.g., a floating production storage and offloading (FPSO) vessel) including a plurality of machine components.

FIG. 7 illustrates the GUI 20 in the form of GUI 700. As shown, the hierarchy option 302 selected is machines, the primary display option 304 selected is "status" and the secondary display option 304B is "compression system." In the first GUI portion 300A, the hierarchical view space 306 includes a variety of fleet vessels, with selection of the fleet vessel "Orr." The components of this selected fleet vessel are illustrated in the second GUI portion 300B and include compressors A-1, A-2, A-3, B1-1, B1-2, B1-3, B2-1, B2-2, C-1, and C-2. The compressors A-1, A-2, and A-3, highlighted with box 702A in the hierarchical view space 306A and box 702B in second GUI portion 300B, are identical.

Figure 8:
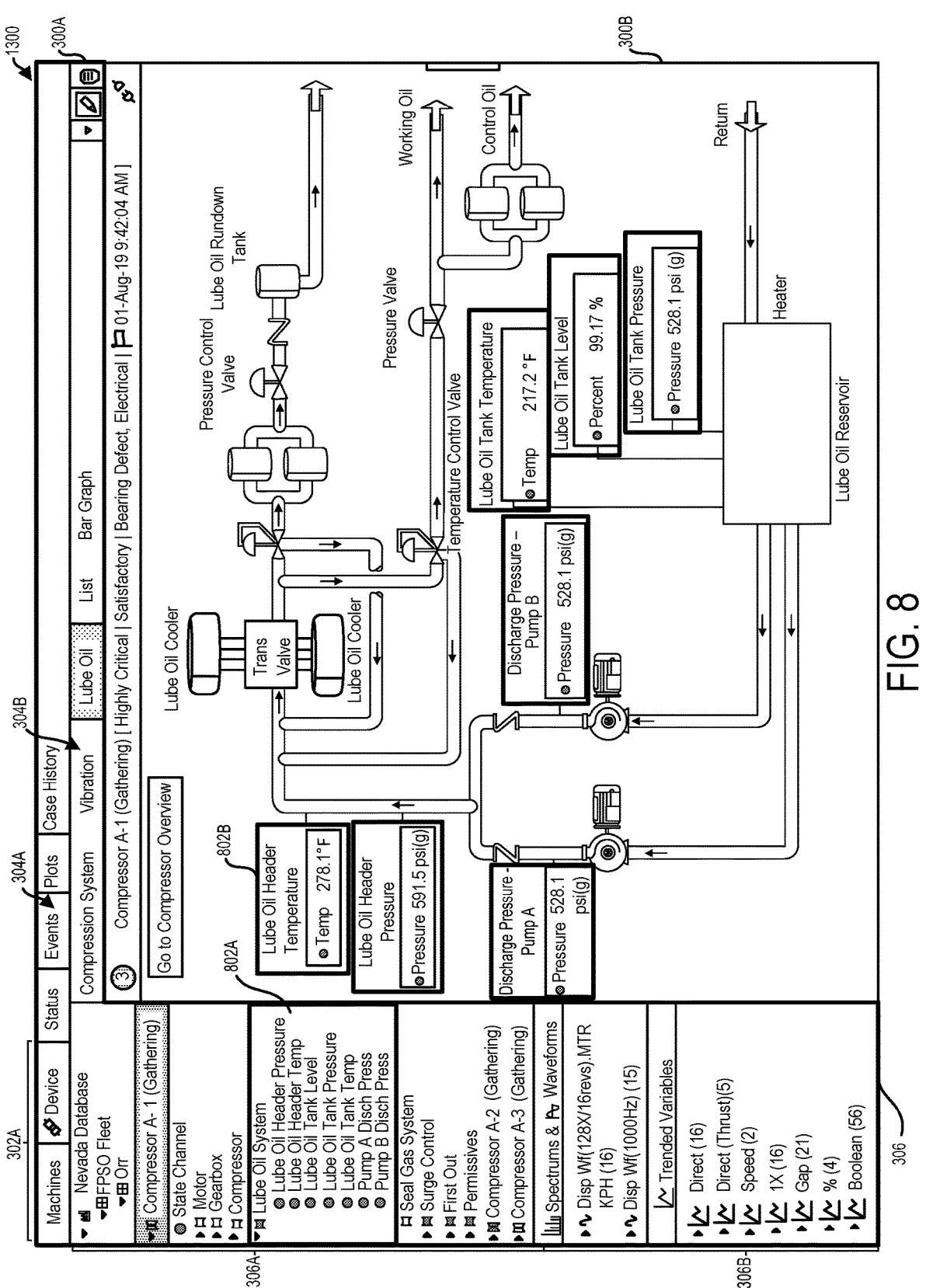
FIG. 8 is a diagram illustrating one exemplary embodiment of a GUI generated by the condition monitoring system of FIG. 2 displaying visualization of a first component (e.g., a first compressor) of the industrial site selected from the GUI of FIG. 7, sub-components of the first component (e.g., a lube oil system), and measurement points of a selected subcomponent populated with real-time data associated with the first component.

FIG. 8 illustrates the GUI 20 in the form of GUI 800 resulting from selection of the compressor A-1 in the hierarchical view space 306A. As shown, the hierarchical list is updated to display components of the compressor A-1 within the hierarchical view space 306A. Examples of these components include motor, gearbox, compressor, lube oil system, seal gas system, surge control, first out, and permissives. A visualization of the compressor A-1 is further presented within the second GUI portion 300B.

The lube oil system component supporting compressor A-1 can be modeled by the machine model configuration 600. The measurement points of the lube oil system include lube oil measurement points (e.g., header pressure, header temp, tank level, tank pressure, tank temperature discharge pressures), as highlighted in the box 802A within the hierarchical view space 306 and the boxes 802B in the second GUI portion 300B. The machine model configuration 600 of the compressor A-1 associates respective data sources and measurement points. Thus, the measurement points displayed within the second GUI portion 300B can include real-time measurements received from the respective data sources.

Figure 9:
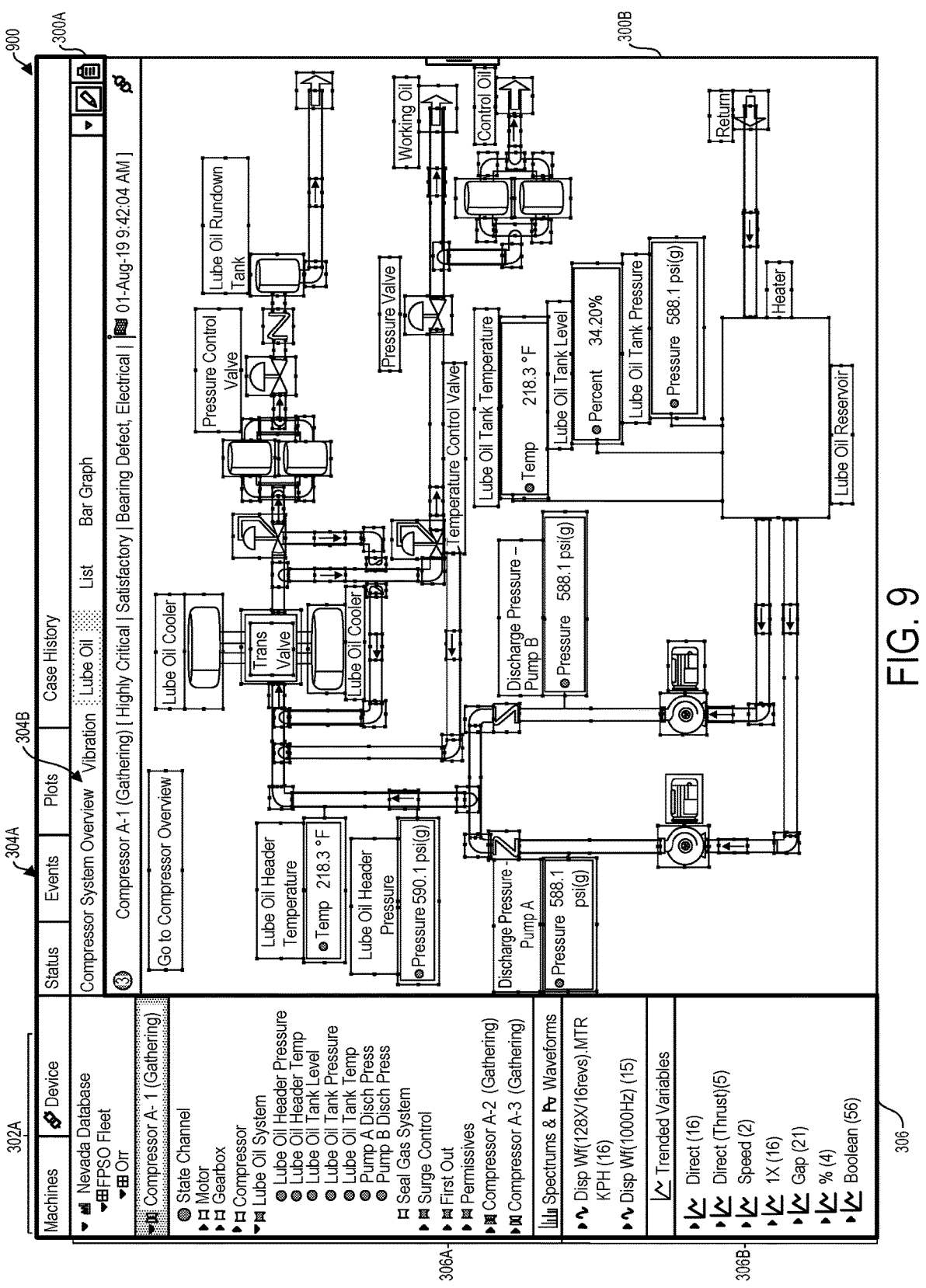
FIG. 9 is a diagram illustrating one exemplary embodiment of a GUI generated by the condition monitoring system of FIG. 2 displaying copying of the first component visualization of FIG. 8.

A user can export the visualization content of the lube oil system of compressor A-1, from the second GUI portion 300B, as shown in FIG. 9. As an example, exporting can be performed by copying the visualization content (e.g., drawing a box around the visualization content within second GUI portion 300B and typing CTRL-C). In an alternative embodiment, the visualization can be exported as a file.

Subsequently, the user can generate a visualization of a lube oil system for another machine using the exported lube oil system visualization. For the sake of example, the lube oil system is discussed below in the context of being copied to compressor A-2.

Figure 10A:
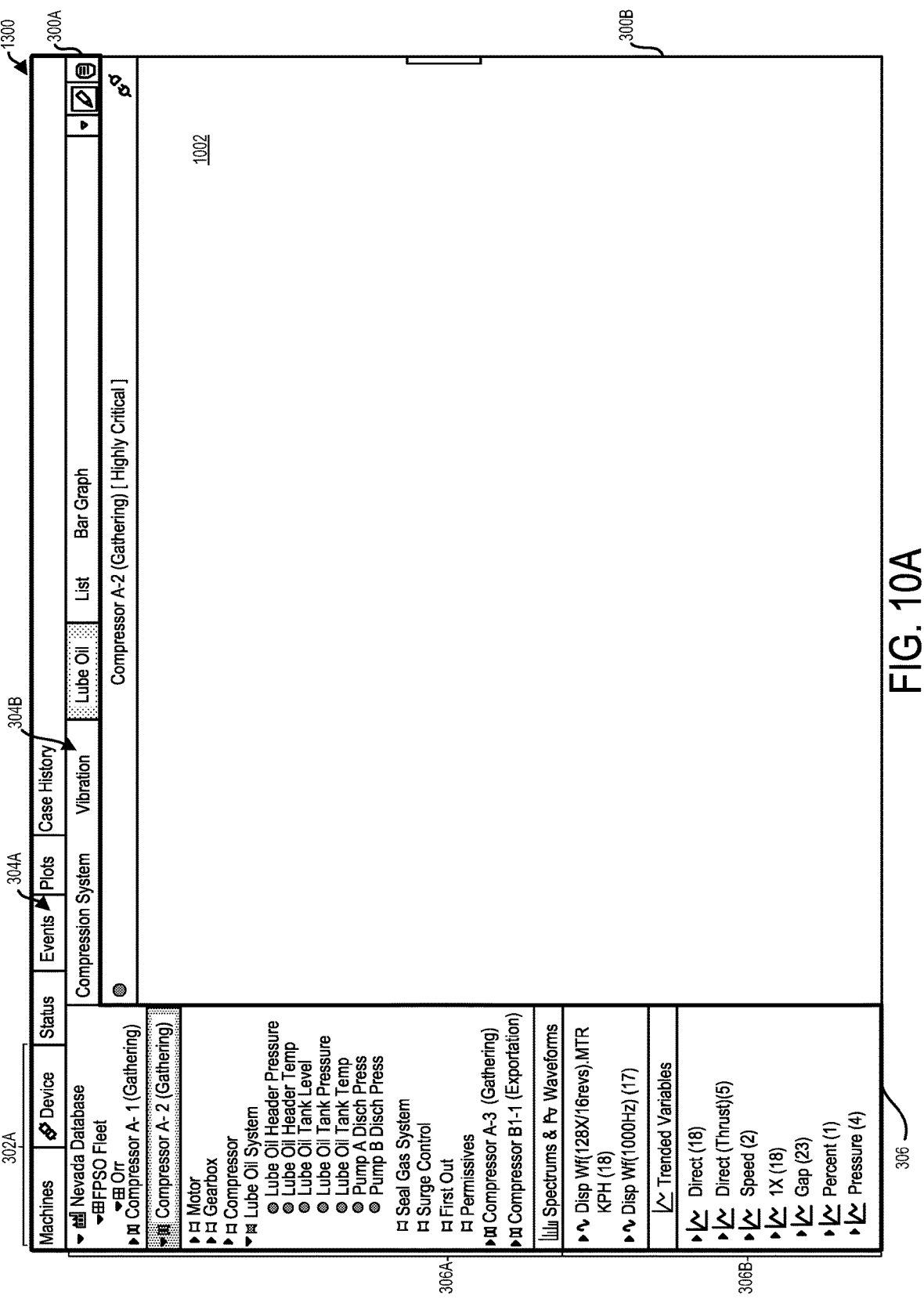
FIG. 10A is a diagram illustrating one exemplary embodiment of a GUI generated by the condition monitoring system of FIG. 2 displaying visualization of a second component (e.g., a second compressor) of the industrial site prior to population of the visualization.

FIG. 10A illustrates the GUI 20 in the form of GUI 1000 resulting from selection of the compressor A-2 within the hierarchical view space 306. Because the components of the compressor A-2 and corresponding measurement points are known from the machine model configuration of compressor A-2, selection of a component of the compressor A-2 can result in expansion of the hierarchical list to display measurement points of the selected component. Accordingly, selection of the lube oil system displays the measurement points of the lube oil system within the hierarchical view 306. Prior to establishing a visualization of the lube oil system of compressor A-2, the second GUI portion 300B displays a blank page in response to selection of the lube oil system in the hierarchical view 306.

Figure 10B:
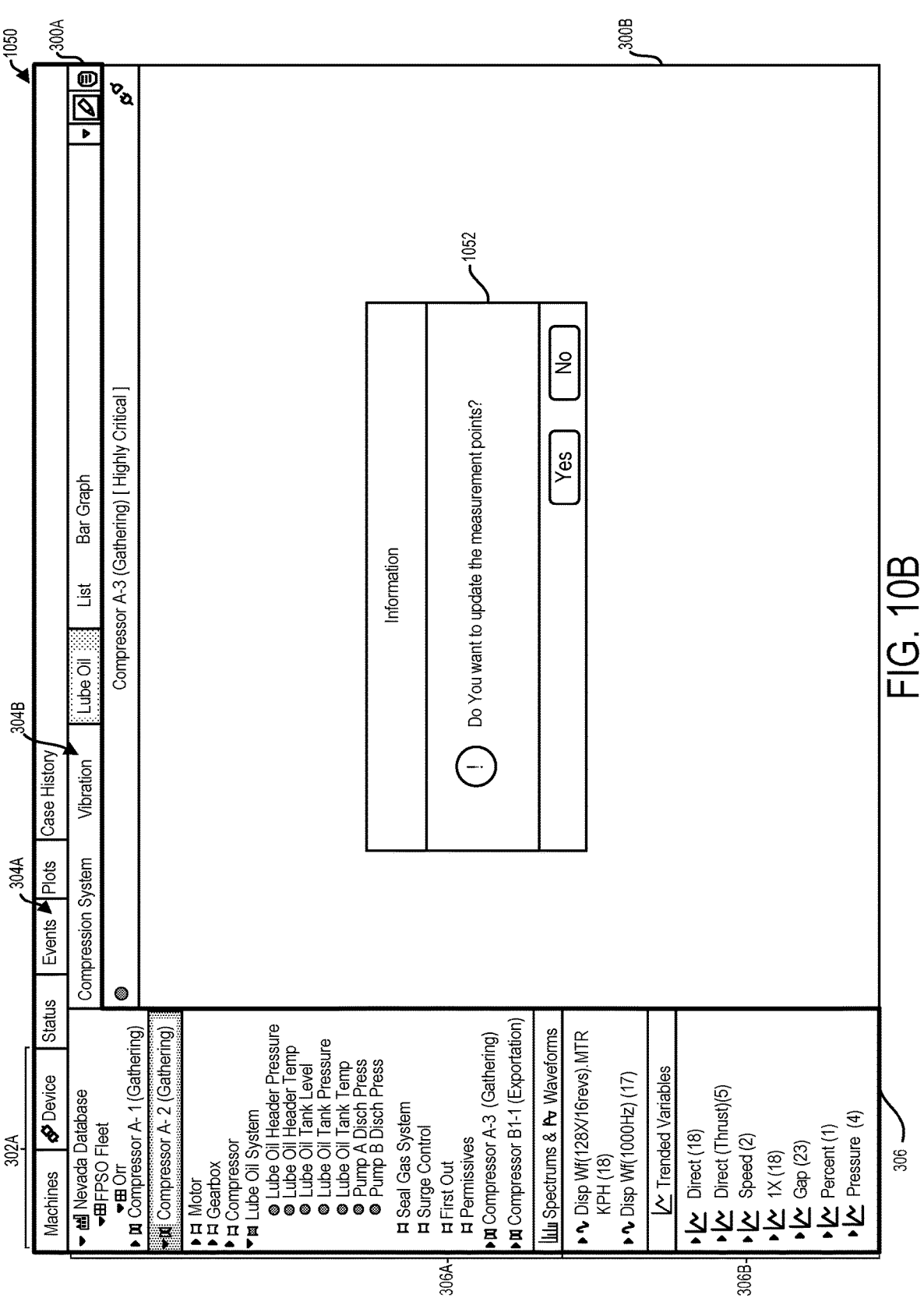
FIG. 10B is a diagram illustrating the GUI including a prompt overlaid upon the GUI of FIG. 10A in response to importing the first visualization copied from the GUI of FIG. 8.

The exported lube oil system visualization can be imported into the blank visualization of the second GUI portion 300B. As an example, the lube oil visualization copied from compressor A-1 can be pasted within the blank visualization 1002 (e.g., selecting the second GUI portion 300B and typing CTRL-P). FIG. 10B illustrates the GUI 20 in the form of GUI 1050 after pasting the copied visualization. Optionally, a prompt 1052 can be presented asking the user to confirm that the measurement points should be automatically updated to reflect the data sources of the new machine (e.g., compressor A-2).

Figure 11:
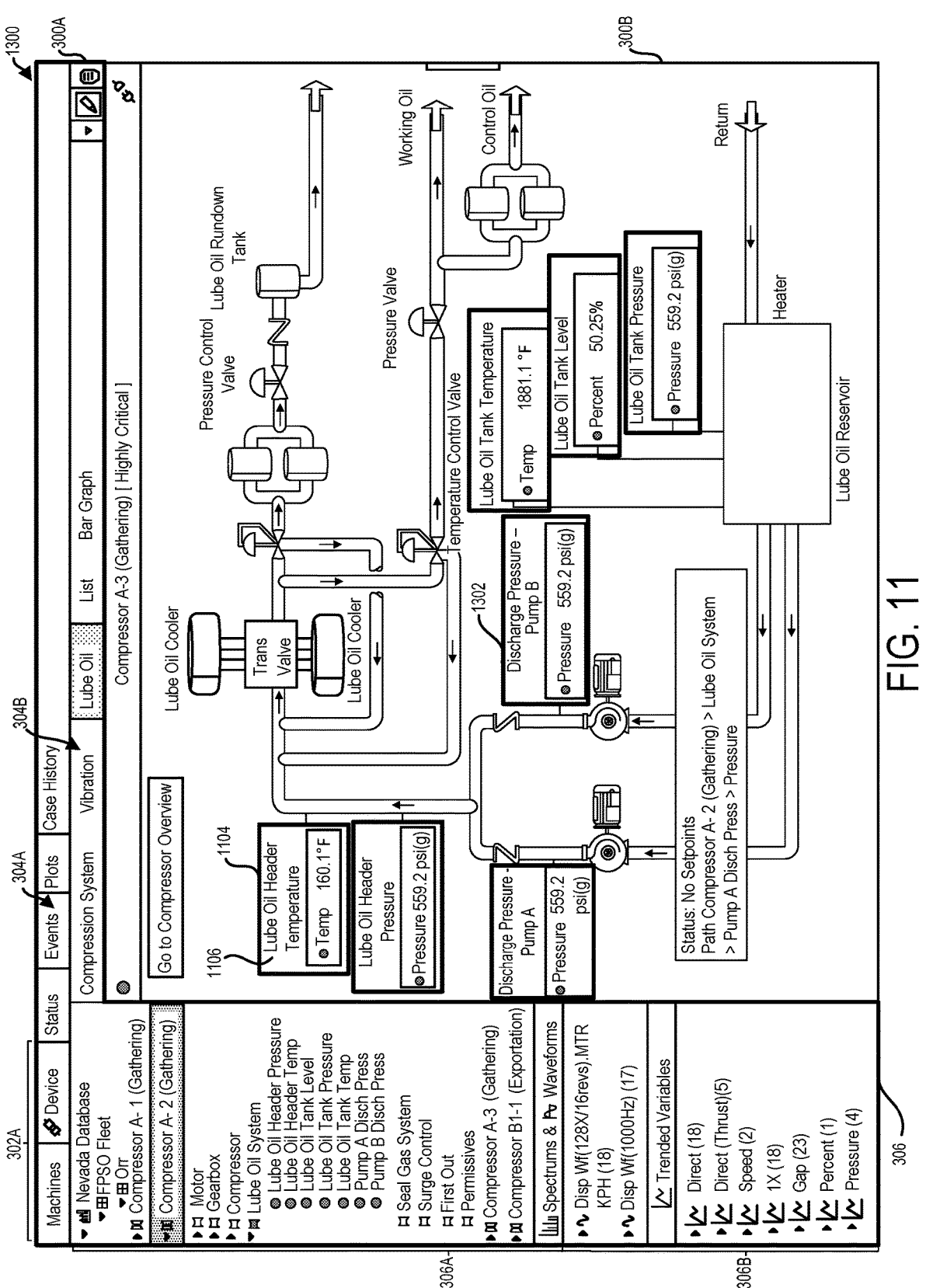
FIG. 11 is a diagram illustrating one exemplary embodiment of a GUI generated by the condition monitoring system of FIG. 2 displaying visualization of the second component (e.g., a second compressor) of the industrial site including measurement points populated with real-time data associated with the second component.

FIG. 11 illustrates the GUI 20 in the form of GUI 1100 generated after the yes option is selected from the prompt 1052. Alternatively, under circumstances where the prompt 1052 is omitted, the GUI 1100 can be generated after the lube oil visualization copied from compressor A-1 is pasted within the blank visualization 1002. As shown, the second GUI portion 300B includes the lube oil visualization 1102 coped from compressor A-1 including measurement points 1104.

Under circumstances where the measurement points 1104 are automatically updated, the data sources 606 corresponding to respective measurement points 604 of the machine configuration model 600 for the compressor A-2 can be mapped to the measurement points 1104 of the copied visualization 1102. As an example, a unique identifier can be associated with each measurement point 604 of the machine configuration model 600 and each measurement point 1104 of the copied visualization 1102. The condition monitoring system 12 (e.g., processor 26) can compare unique identifiers of the measurement points 604 of the machine configuration model 600 and measurement points 1104 of the copied visualization 1102 to identify matches (e.g., a measurement point 604 having the same unique identifier as a measurement point 1104). Thus, a measurement point 1104 of the copied visualization 1102 can display outputs 1106 associated with matched measurement point 604 of the machine model configuration 600.

Figure 12:
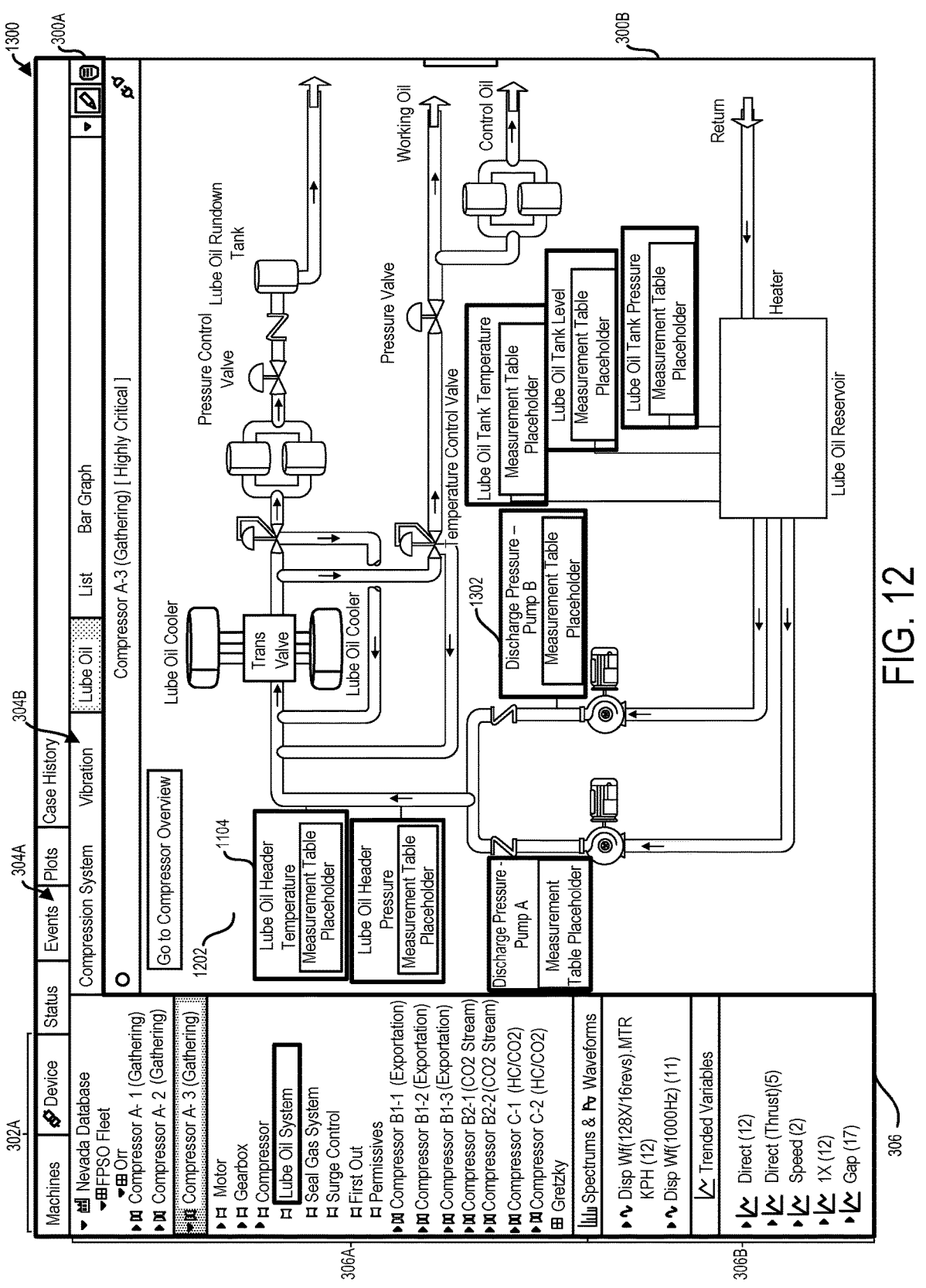
FIG. 12 is a diagram illustrating one exemplary embodiment of a GUI generated by the condition monitoring system of FIG. 2 displaying visualization of the second component (e.g., a second compressor) of the industrial site including measurement points populated with placeholders.

FIG. 12 illustrates the GUI 20 in the form of GUI 1200. GUI 1200 can include placeholders 1202 in lieu of outputs 1106 for any measurement point 1104 of the copied visualization 1102 that is not matched with a measurement points 604 of the machine configuration model 600. In one example, a placeholder 1202 can be displayed for a measurement component 1104 that is present within the machine model configuration 600 of the first compressor A-1 and is absent from the machine model configuration 600 of the second compressor A-2. In another example, placeholders 1202 can be displayed for all measurement components 1104 when the user selects the no option in the prompt 1052.

Figure 13A:
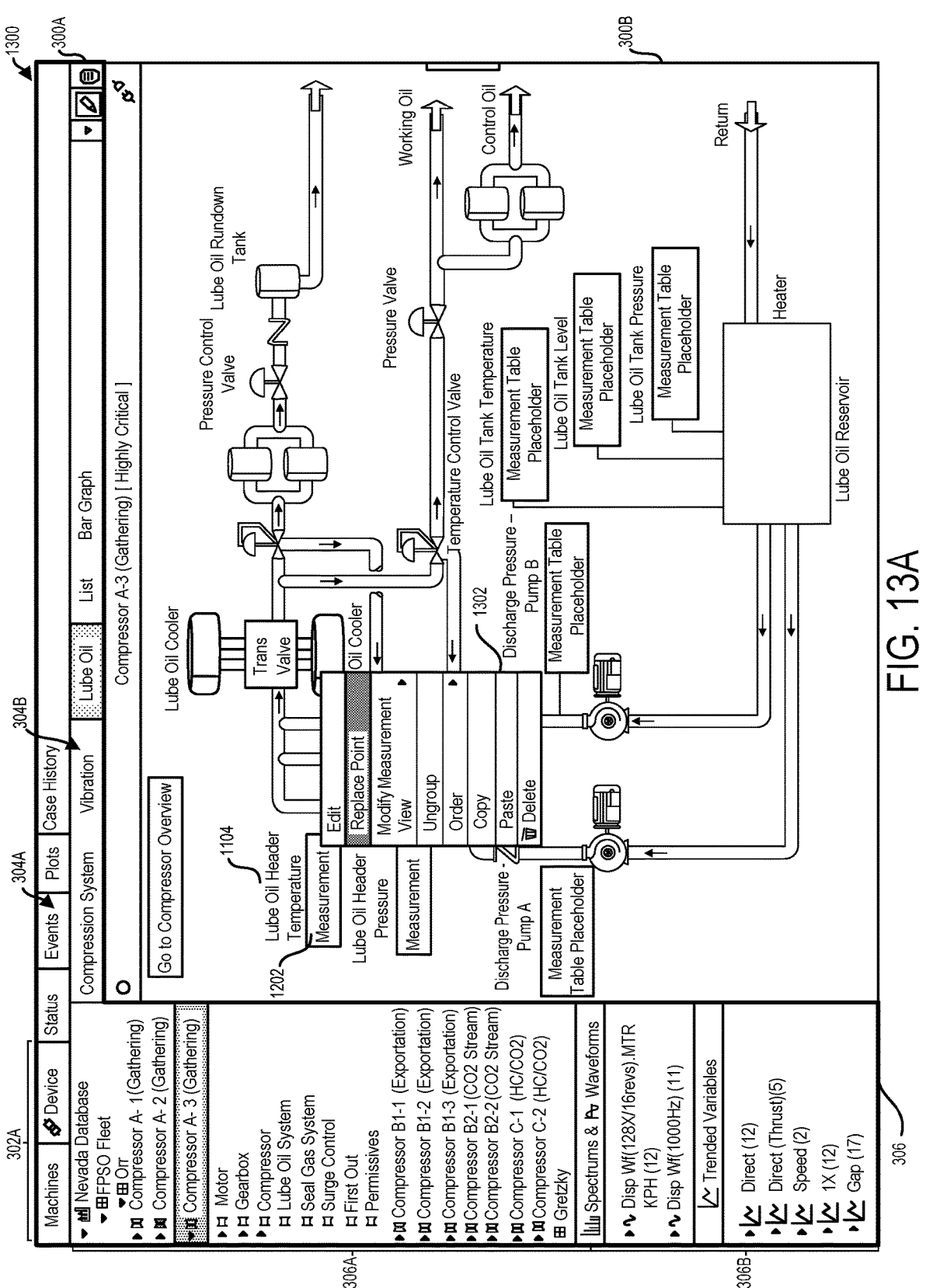
FIG. 13A is a diagram illustrating one exemplary embodiment of a GUI generated by the condition monitoring system of FIG. 2 displaying a menu overlying the GUI of FIG. 12, the menu being configured to update a placeholder for a selected measurement point.

In either case, a measurement point 1104 of the copied visualization can be manually associated with a data source in order to replace a placeholder 1202 with an output 1106. FIG. 13A illustrates the GUI 20 in the form of GUI 1300 including a menu 1302 displayed in response to selection of a placeholder 1202 (e.g., a right mouse click). As shown, the menu 1302 includes an option to replace the selected measurement point 1104.

Figure 13B:
FIG. 13B is a diagram illustrating one exemplary embodiment of a GUI generated by the condition monitoring system of FIG. 2 displaying selectable options of data sources for the selected measurement point of FIG. 13A.

FIG. 13B illustrates the GUI 20 in the form of GUI 1350 including a window 1350 displayed in response to selection of the "replace" option in menu 1302. As shown, the window 1350 is configured to allow the user to select a data source for the selected measurement point 1104. As an example, FIG. 13B illustrates selection of "Lube Oil Header Pressure" that is associated with a predetermined data source.

FIG. 14 illustrates one exemplary embodiment of a method 1400 for generating GUIs in accordance with the embodiments discussed above. As shown, the method 1400 includes operation 1402 to 1420. However, it can be understood that alternative embodiments of the method can include greater or fewer operations than illustrated in FIG. 14 and that the operations can be performed in a different order than illustrated in FIG. 14.

In operation 1402, a machine model configuration is maintained in a memory. The machine model configuration can associate measurement points of a first component of a first machine with respective first data sources.

In operation 1404, a GUI is generated (e.g., by a processor). The GUI can include a first GUI portion and a second GUI portion. The first GUI portion can display a list of a plurality of machines including the first machine. The second GUI portion can include a visualization of one or more components of the first machine including the first component, one or more measurement points of the first component, and outputs of the respective first data sources associated with the one or more measurement points of the first component.

In operation 1406, in response to a user selection, the visualization of the first component can be copied (e.g., by the processor) from the second GUI portion.

In operation 1410, a selection of a second machine within the first GUI portion (e.g., by the processor).

In operation 1412, the first GUI portion can be updated (e.g., by the processor) to add the first component as a second component associated with the second machine.

In operation 1414, the copied visualization of the first component can be pasted within the second GUI portion corresponding to the second component (e.g., by the processor).

In operation 1416, respective second data sources associated with the one or more measurement points of the second component can be identified (e.g., by the processor).

In one embodiment, the machine model configuration can also include associations of second data sources with respective ones of the measurement points of a second component. Under this circumstance, identifying the respective second data sources can also include receiving, by the processor, the second data sources associated with respective ones of the measurement points of the second component from the machine configuration model.

In an alternative embodiment, identifying the respective second data sources can include receiving, by the processor, the second data sources associated with respective ones of the measurement points of the second component from user input. As discussed above, the second GUI portion corresponding to the second component can be configured to display a placeholder in lieu of the output of a second data source associated with at least one of the measurement points of the second component. The second GUI portion corresponding to the second component can display a list of second data sources in response to selection of the placeholder of a measurement data point, and receive a user selection of a second data source from the list of second data sources.

In operation 1420, the second GUI portion corresponding to the second component can be updated to display the output of the identified second data sources.

Exemplary technical effects of the methods, systems, and devices described herein include, by way of non-limiting example, faster generation of graphical user interfaces for condition monitoring of industrial machines, improved consistency of generated graphical user interfaces, and reduced cost for generating the graphical user interfaces.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such w-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method for generating graphical user interfaces for condition monitoring, comprising:

maintaining, by a memory, a machine model configuration associating points of measurement of a first component of a first machine of one or more existing industrial plants with respective first data sources;

generating, by a processor in communication with the memory, a graphical user interface (GUI) including:

a first GUI portion displaying a list of a plurality of machines including the first machine and a second machine of the one or more existing industrial plants; and a second GUI portion including a window illustrating one or more components of the first machine including the first component, one or more first subcomponents of the first component that require measurement, and outputs of the respective first data sources corresponding to one or more first measurements acquired at the one or more first subcomponents of the first component;

copying, by the processor in response to a user selection, the first component from the second GUI portion;

receiving, by the processor, a selection of the second machine within the first GUI portion;

updating, by the processor, the first GUI portion to add the first component as a second component associated with the second machine;

pasting, by the processor, the copied first component within the second GUI portion corresponding to the second component;

identifying, automatically, by the processor, one or more second subcomponents of the second machine that require measurement and respective second data sources associated with the one or more second subcomponents of the second machine; and updating, automatically, by the processor, the second GUI portion corresponding to the second component, to display real-time outputs of the identified second data sources corresponding to one or more second measurements acquired at the one or more second points of the second machine.

2. The method of claim 1, wherein identifying the respective second data sources comprises receiving the second data sources associated with respective ones of the second subcomponents of the second machine from the machine configuration model.

3. The method of claim 1, further comprising, by the processor, updating the second GUI portion corresponding to the second component to display a placeholder in lieu of the output of a second data source associated with at least one of the second subcomponents of the second machine.

4. The method of claim 3, further comprising, by the processor:

updating the second GUI portion corresponding to the second component to display a list of second data sources in response to selection of the placeholder of a second subcomponent; and receiving a user selection of a second data source from the list of second data sources.

5. The method of claim 1, further comprising generating, by the processor within the first GUI portion, a hierarchical view comprising:

a site level including one or more sites;

a process system level including a plurality of process systems of a site selected from the site level; and a machine level including the plurality of machines of a process system selected from the process system level.

6. A system for generating graphical user interfaces for condition monitoring, comprising:

a memory maintaining a machine model configuration associating points of measurement of a first component of a first machine of one or more existing industrial plants with respective first data sources; and a processor in communication with the memory, the processor being configured to:

generate a graphical user interface (GUI) including a first GUI portion displaying a list of a plurality of machines including the first machine and a second machine of the one or more existing industrial plants, and a second GUI portion including a window illustrating one or more components of the first machine including the first component, one or more first subcomponents of the first component that require measurement, and outputs of the respective first data sources corresponding to one or more first measurements acquired at the one or more first subcomponents of the first component;

copy, in response to a user selection, the first component from the second GUI portion;

receive a selection of the second machine within the first GUI portion;

update the first GUI portion to add the first component as a second component associated with the second machine;

paste the copied first component within the second GUI portion corresponding to the second component;

identify, automatically, one or more second subcomponents of the second machine that require measurement and respective second data sources associated with the one or more second subcomponents of the second machine; and update, automatically, the second GUI portion corresponding to the second component to display real-time outputs of the identified second data sources corresponding to one or more second measurements acquired at the one or more second points of the second machine.

7. The system of claim 6, wherein identifying the respective second data sources comprises receiving, by the processor, the second data sources associated with respective ones of the second subcomponents of the second machine from the machine configuration model.

8. The system of claim 6, further comprising, by the processor, updating the second GUI portion corresponding to the second component to display a placeholder in lieu of the output of a second data source associated with at least one of the second subcomponents of the second machine.

9. The system of claim 8, further comprising, by the processor:

updating the second GUI portion corresponding to the second component to display a list of second data sources in response to selection of the placeholder of a second subcomponent; and receiving a user selection of a second data source from the list of second data sources.

10. The system of claim 6, wherein processor is further configured to generate, within the first GUI portion, a hierarchical view comprising:

a site level including one or more sites;

a process system level including a plurality of process systems of a site selected from the site level; and a machine level including the plurality of machines of a process system selected from the process system level.

*     *     *     *     *